Jan. 14, 1958     E. C. ROBBINS     2,819,591

ICE BLOCK HARVESTING APPARATUS

Filed June 18, 1956     3 Sheets-Sheet 1

INVENTOR.
Edgar C. Robbins
BY
His Attorney

Jan. 14, 1958 E. C. ROBBINS 2,819,591
ICE BLOCK HARVESTING APPARATUS
Filed June 18, 1956 3 Sheets-Sheet 2

INVENTOR.
Edgar C. Robbins
BY Edwin S. Dybvig
His Attorney

Jan. 14, 1958  E. C. ROBBINS  2,819,591
ICE BLOCK HARVESTING APPARATUS
Filed June 18, 1956  3 Sheets-Sheet 3

INVENTOR.
Edgar C. Robbins
BY Edwin S. Dybvig
His Attorney

United States Patent Office 2,819,591
Patented Jan. 14, 1958

2,819,591

ICE BLOCK HARVESTING APPARATUS

Edgar C. Robbins, Dayton, Ohio, assignor to General Motors Corporation, Detroit, Mich., a corporation of Delaware Application June 18, 1956, Serial No. 592,046

15 Claims. (Cl. 62—106)

This invention relates to refrigeration and more particularly to an arrangement and apparatus for ejecting ice blocks from a freezing device placed into association therewith.

The public has received and favorably accepted a unique arrangement recently placed on the market whereby ice blocks are ejected from a freezing device including a tray which is twisted by pushing the device along differently shaped or inclined tracks in the frozen food storage compartment of a refrigerator cabinet. While this acceptance has been rather general throughout this country and elsewhere it is nevertheless the duty of manufacturers of household refrigerators to strive for a better ice block ejecting arrangement wherein the force required to be expended by a housewife or others to operate a manually actuatable mechanism for ejecting ice blocks from a freezing device will be materially reduced to ease the operation and render the arrangement more acceptable and of greater sales appeal. This invention therefore pertains to an arrangement of this character and specifically to an improvement over the ice block harvesting arrangement disclosed in the copending application of Richard S. Gaugler and Robert Galin, S. N. 494,085 filed March 14, 1955, now Patent #2,772,542 dated December 4, 1956, and assigned to the assignee of the present application.

An object of my invention is to provide an improved and easily operated apparatus for twisting a tray of a freezing device associated with a household refrigerator to eject or release ice blocks from the device which apparatus reduces the tendency of a flexible metal tray becoming bent or permanently distorted out of shape after continued twisting operations thereof.

Another object of my invention is to place a freezing device including a tray with partitioning walls and ice blocks therein as a unit upon supports within a box-like member mounted in the freezing or frozen food storage chamber of a refrigerator cabinet with one end of the tray inserted or fitting into a pivotally mounted socket element associated with the supports and to swing the socket element about its pivotal mounting to first twist the tray along its length and shift walls therein relative thereto for breaking bonds between the device and ice blocks contained therein and then to suddenly release the tray twisting force whereby to utilize energy stored up in the torqued tray to bang the socket element against a stop for tossing the loosened ice blocks out of the freezing device.

Another object of my invention is to arrange and so connect a plurality of levers in a freezing device ice ejector structure or apparatus in a novel manner to produce a force multiplying mechanism which when operated will use a minimum of effort on the part of an operator to swing a pivotally mounted tray receiving socket element for twisting the tray of a freezing device received therein to eject ice blocks therefrom.

A further object of my invention is to bang a sturdy freezing device tray receiving and twisting socket element against a rigid stop on a member upon which the element is pivotally mounted so that the stop and the socket element absorb the banging force of the torqued tray as distinguished from banging or flipping the tray itself against a stop so that such force will not damage the tray.

In carrying out the foregoing objects it is a still further and more specific object of my invention to enclose the various levers and connecting links therebetween of a force multiplying mechanism within walls of a freeznig device receiving and ice block ejecting apparatus or box-like member to prevent the mechanism from injuring fingers or hands of persons operating the same.

Further objects and advantages of the present invention will be apparent from the following description, reference being had to the accompanying drawings, wherein a preferred form of the present invention is clearly shown.

Figure 1:
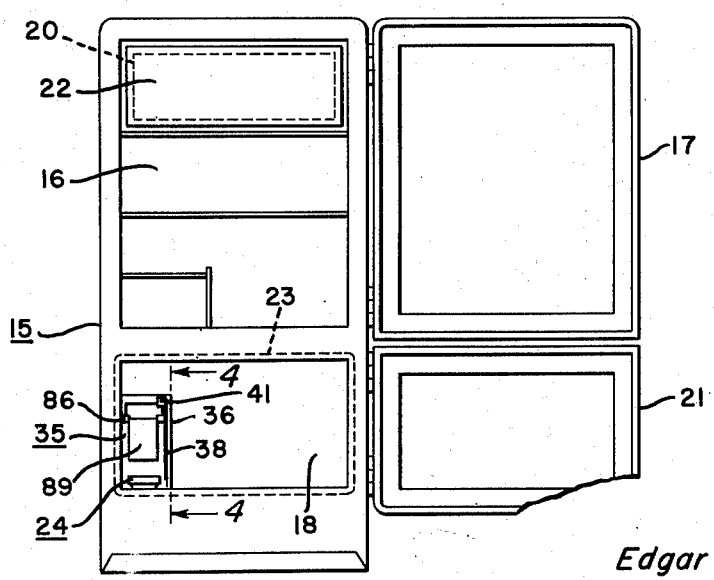
Figure 1 is a front view of a multiple compartmented household refrigerator cabinet with the main doors opened showing an ice harvesting apparatus of the present invention located in the lower or freezing chamber of the refrigerator.

Referring to the drawings, for illustrating the invention, I show in Figure 1 thereof a refrigerating apparatus including an insulated household refrigerator cabinet 15 of the multiple compartment type having the present invention embodied in one of the chambers thereof. Cabinet 15 is provided with an upper unfrozen food storage compartment or chamber 16 which is cooled to a temperature above 32° F. by an evaporator 20 of a refrigerating system associated with cabinet 15 in any suitable, conventional and now well known manner. Evaporator 20 may be of the flat plate type mounted in chamber 16 along its back wall behind a concealing baffle 22. An insulated door structure 17 hingedly mounted on cabinet 15 normally closes the access opening of chamber 16. The cabinet 15 is also provided with a lower freezing or frozen food storage compartment or chamber 18 which is cooled to a temperature well below 32° F. for the storage of frozen foods, for freezing foods and/or for freezing water in freezing devices into separated ice blocks for table use in chilling salads, cocktails or drinks in glasses. Compartment or chamber 18 is refrigerated by another evaporator, of the refrigerating system associated with cabinet 15, which may be in the form of a conduit 23 coiled or wrapped around the outside of a metal can-like liner member 19 forming walls of chamber 18. An insulated door structure 21, separate from door 17, is hingedly mounted on cabinet 15 and normally closes the front access opening of chamber 18. Chamber 18 may be provided with superimposed rollable or slidable shelves or baskets for the storage of frozen foods and are not shown in the drawings for the sake of clarity. A plurality of freezing devices, generally represented by the reference numeral 24, may be supported upon and in metal to metal contact with the bottom wall of liner 19 of chamber 18. These freezing devices 24 are of the nature of a tray and grid walls therein for containing water to be frozen into separated ice blocks.

Figure 2:
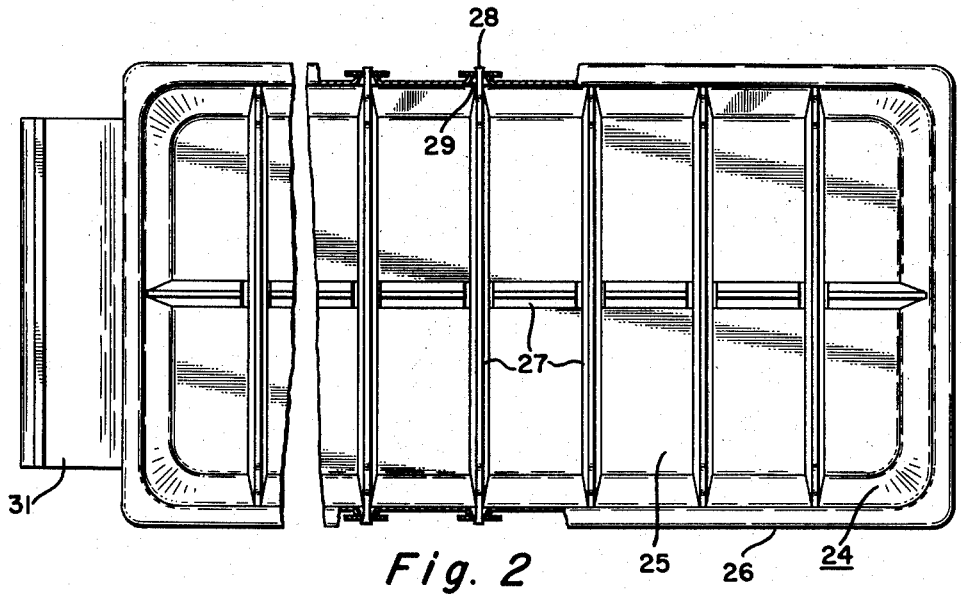
Figure 2 is a broken top view partly in section of a unitary freezing device adapted to be placed in association with the ice harvesting means or apparatus.
Figure 3:
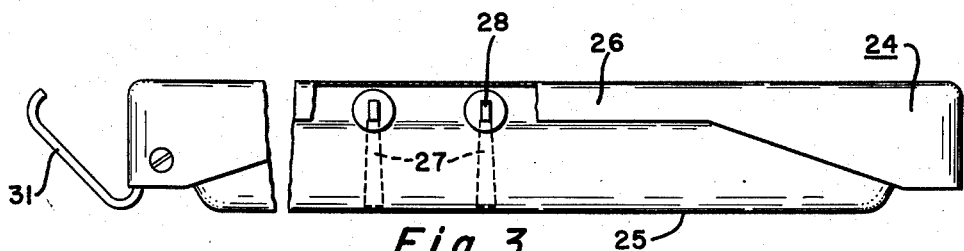
Figure 3 is a broken side view partly in section of the freezing device shown in Figure 2.

The general construction of each of the freezing devices 24 is of a type somewhat similar to the device disclosed in the copending application of Richard S. Gaugler, S. N. 438,897, filed June 24, 1954 entitled Freezing Device, now Patent #2,752,762 dated July 3, 1956, and are preferably or more specifically of the type disclosed in the copending application of Edward C. Simmons and Edgar C. Robbins, S. N. 570,287, filed March 8, 1956 and entitled Ice Ejector Tray, now Patent No. 2,785,539 dated March 19, 1957, which patents are also assigned to the assignee of the present application. Briefly each freezing device 24 includes a distortable aluminum or other suitable metal tray 25 (see Figures 2 and 3) having a rim 26 therearound and a plurality of rigid metal or molded plastic tapered walls 27 forming a grid therein which divides the interior of tray 25 into compartments in which water is to be frozen into separated ice blocks. Walls 27 within tray 25 are provided with ear-like projections 28 loosely anchored or fitting in vertically elongated openings 29 formed in the upright sides of tray 25 so as to be movable relative thereto. The projections 28 are retained in the openings 29 to movably lock walls 27 within tray 25 against removal therefrom. The loose attaching or anchoring points of walls 27 to tray 25 permit these walls to move a short distance angularly relative to the tray, in a direction along its length, and to also swing or rock about their anchoring points as is fully described in the copending applications above referred to when the tray is flexed and/or twisted by an ice block releasing or ejecting means to be hereinafter explained and to which the present invention is directed. Tray 25 is provided at one end with a handle 31 pivotally mounted thereon in any suitable or conventional manner. The tray of the present freezing device differs somewhat from that shown in the Simmons and Robbins application above referred to in that it is devoid of the holding and twisting studs secured to the rear end thereof. The reason for this is that they are undesirable from several standpoints and the ice ejector arrangement herein disclosed and hereinafter described permits their elimination and consequently troubles caused by use thereof.

Figure 4:
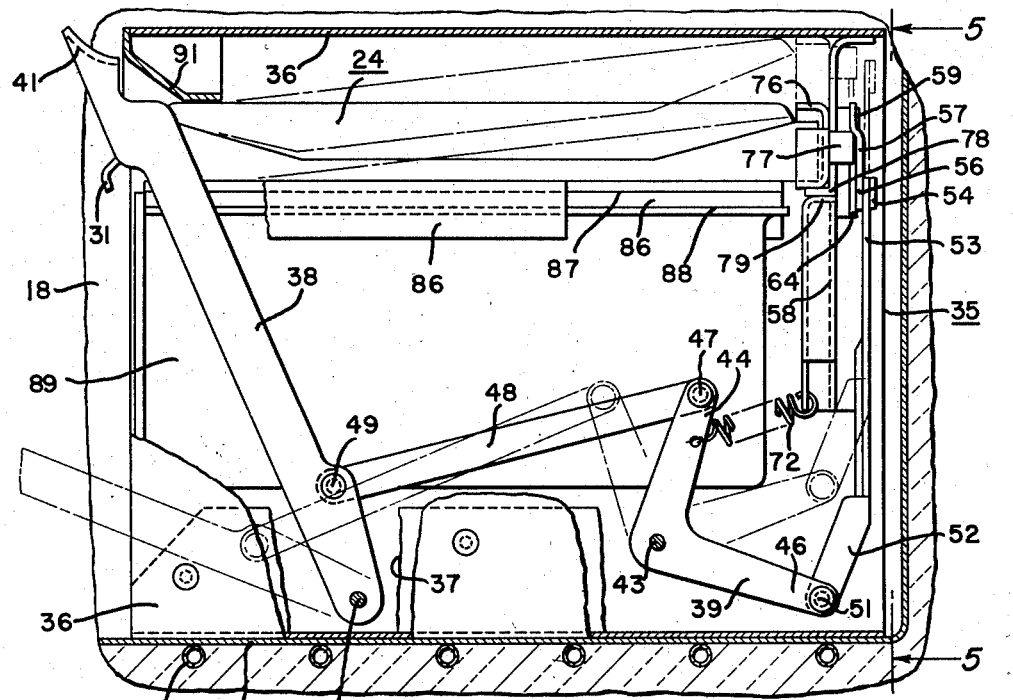
Figure 4 is a fragmentary enlarged sectional view taken on the line 4—4 of Figure 1 with wall portions of the ice harvesting means broken away to more clearly show parts of the mechanism thereof.
Figure 5:
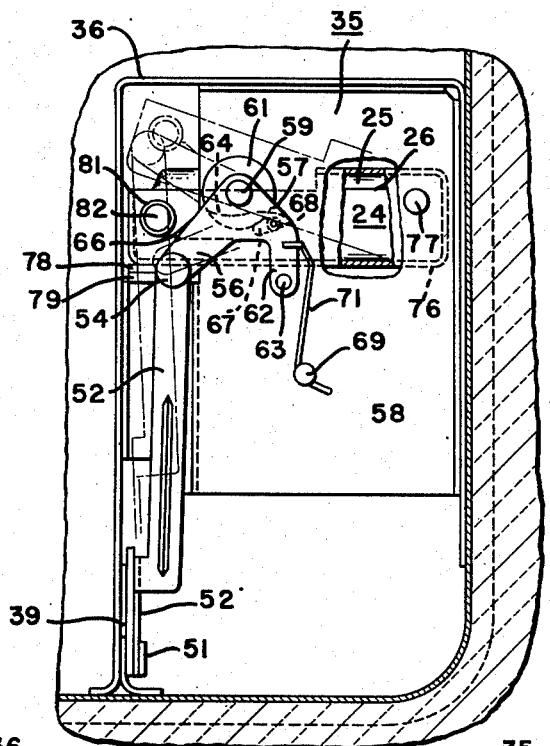
Figure 5 is a rear view of the ice harvesting apparatus with wall portions of the socket and box-like member thereof broken away to more clearly show parts thereof.

In accordance with the objects of this invention, I mount or secure an ice block ejector means in the freezing or frozen food storage chamber 18 of cabinet 15, walls of which form a compartment therein and provide a place where ice blocks can be removed from the freezing device 24 and stored in this compartment in dry form until harvested therefrom. The ice ejector means or apparatus is in the form of a box-like member, generally represented by the numeral 35, and includes a substantially inverted U-shaped sheet metal housing 36 having one side thereof removably secured to a side wall of liner 19 of chamber 18 by suitable screws or the like, not shown, and having a leg of the housing 36 removably secured by screws or the like, not shown, to the bottom of the liner 19. The housing 36 cooperates with walls of liner 19 to form the ice ejector and ice block storage compartment within chamber 18. While the box-like member 35 is preferably rigidly secured within chamber 18, in a manner to permit a serviceman to remove same from the chamber for repairs, it is understood that this member 35 could be loosely positioned in chamber 18 to permit the user of the refrigerator to remove the same at will from chamber 18. A plurality of heavy metal plates or brackets are riveted or welded to walls of housing 36 to reinforce same and for supporting various levers of a force multiplying mechanism and other elements within the compartment formed thereby. For example, a side plate 37 secured to the bottom of the one leg of housing 36 and to the bottom wall of liner 19 provides bearing points for pivotally mounting a manually actuated lever 38 and a bell-crank lever 39 within the compartment of chamber 18 (see Figure 4). Lever 38 has a handle end 41 projecting outwardly from the open front of the box-like member 35 and has its other end pivotally mounted, by a stud or the like 42, to a side of member 35. The bell-crank lever 39 is pivotally mounted to member 35 by a stud or the like 43 and has two arms 44 and 46. The end of arm 44 of lever 39 is connected by a pin or stud 47 to one end of link 48 which has its other end attached by a pin or stud 49 to lever 38. The end of arm 46 of bell-crank lever 39 is connected by a pin or stud 51 to one end of another link 52 which is bent to extend around a rear corner of the box and upwardly within and at the back of the box-like compartment (see Figures 4 and 5). Upper end 53 of link 52 is connected by a pin or stud 54 to one arm 56 of another bell-crank lever 57 pivotally mounted upon a rear plate 58 by a stud or pin 59. A spacer 61 is also mounted on pin 59. The other arm 62 of lever 57 has its end connected by a pin or stud 63 to an end of a cam finger or member 64 provided with a camming edge surface 66. Finger or cam member 64 is positioned at the side of lever 57 and is provided with an elongated opening 67 intermediate its pivoted end and the camming surface 66 which receives a pin 68 welded to arm 62 of lever 57. Thus finger or cam member 64 is movably carried by the bell-crank lever 57 and its camming surface is adapted to engage under a roller for a purpose to be presently described. A stud 69 secured to rear plate 58 carries a coiled part of a spring 71 which has its one end anchored in a hole provided in plate 58 and has its other or uppermost end bent so as to be disposed in the return path of movement of cam member 64. Cam member or finger 64 is movable in one direction simultaneously with lever 57 and in another direction at a different time relative thereto about the stud 63 for a purpose to be hereinafter described. Another coiled spring 72 (see Figure 4) has its one end attached to arm 44 of bell-crank lever 39 and has its other end secured to a stationary part of the box-like member 35, such as to rear plate 58, and is for the purpose of automatically returning the leverage mechanism to normal position after the same has been actuated.

A horizontally elongated cup-like socket element 76 located in the rear part of box-like member 35 has its one side pivotally mounted upon the back plate 58 by a stud 77 and has the bottom of its other side supported or normally resting on a non-metallic resilient sound deadening block or stop 78 secured to a ledge part 79 provided on plate 58. This other side of socket element 76 has a roller 81 mounted on a stud 82 secured thereto and roller 81 is disposed in the path of movement of cam member 64 but is out of or offset relative to the path of movement of lever 57. Return movement of socket element 76 to its normal position, after having been swung about its pivotal mounting 77 for a purpose herein disclosed, may, if desired, be augmented by a spring. Opposed spaced apart parallel molded plastic rail supports 86 (see Figure 4) are secured to the sides of box-like member 35, within the compartment formed thereby, and each support has two vertically spaced ledges or grooves 87 and 88 provided thereon or therein. The upper ledges 87 on supports 86 are adapted to receive the top of rim 26 of an inverted freezing device 24 and the lower ledges 88 are for receiving flanges formed on a receptacle or container 89 removably supported in the compartment of the box-like member 35. It is to be noted by reference to Figure 4 that the one rail or support on the lever side of box-like member 35 is shorter than the other or opposed support. The portion of the distance from the rear to about the center of the compartment formed by box member 35 is devoid of a rail support 86 and this is for the purpose of insuring that the one side of tray 25 of a device 24 will not be banged against a rail 86 when the socket element 76 is thumped against its stop 78 as will be presently described. A metal bracket 91 is secured to and extends transversely across the interior of box-like member 35 at the front end thereof above the supports 86 to provide an abutment for the bottom of the forward end of a freezing device 24 supported on the ledges 87. The ledges 87 are in substantial alignment with the lower portion of socket element 76 to guide the rear end of a tray 25 of an inverted freezing device 24 thereinto. The front of box-like member 35 is open to provide same with a freezing device receiving opening and for permitting receptacle 89 to be slid into and out of the compartment formed by member 35.

Figure 7:
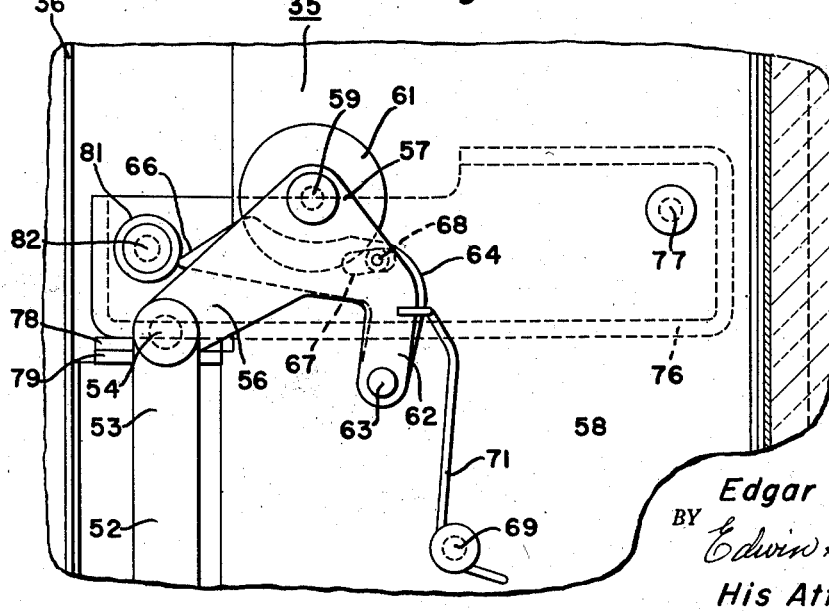
Figure 7 is an enlarged fragmentary view similar to Figures 5 and 6 showing the socket tripping finger or cam about to ride past the roller on the pivoted socket back into its normal position thereunder.
Figure 6:
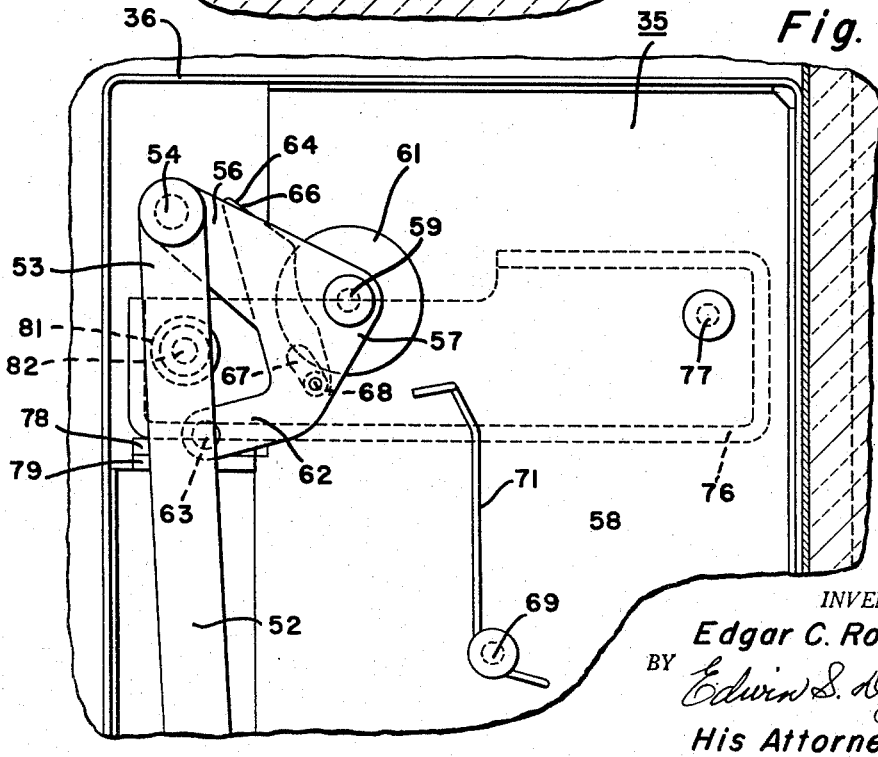
Figure 6 is an enlarged fragmentary view similar to Figure 5 showing the roller on the pivoted socket moved away from the socket tripping finger or cam member.

A tray 25 of freezing device 24 is filled with water and placed on the bottom wall of liner 19 within chamber 18 so as to be in metal heat exchange relationship with the evaporator 20 of the refrigerating system. The water in the device 24 is hard frozen into ice blocks separated from one another in the device by the walls 27 therein. When it is desired to remove ice blocks from the freezing device 24 such device is removed from chamber 18, rotated into inverted position and inserted into the compartment formed by box-like member 35 through its freezing device receiving front opening. The top of the rim of tray 25 of the inverted device 24 is received by and supported on the ledges 87 of supports 86 and the freezing device is pushed rearwardly therealong to position the rear end of tray 25 in the socket element 76 to fit snugly therein intermediate flanged walls thereof. Handle end 41 of lever 38 at the front of member 35 is grasped by the hand and this lever is swung downwardly about its pivotal mounting 42. This motion of lever 38 rotates lever 39, through link 48, and moves link 52 upwardly to rotate lever 57 and cam or finger member 64 simultaneously therewith about the pivot 59. Camming edge surface 66 on finger cam member 64 engages under the roller 81, on the side of socket element 76 opposite its pivotally mounted side, and swings socket element 76 upwardly about its pivotal mounting 77. This twists the tray 25 of the inverted freezing device 24 within member 35 from end to end thereof, since the bottom of the front end of tray 25 engages the bracket 91 and prevents twisting of the forward end of the tray. Twisting of freezing device 24 in this manner causes the tray side walls as well as walls 27 therein to move or shift relative to one another to break bonds between the device and ice blocks therein. This movement of the various parts of the apparatus is depicted by the dot-dash line showing in Figures 4 and 5 of the drawings and should be understandable by one skilled in the art. At a certain predetermined elevated point of roller 81 on socket arrangement 76, during twisting of tray 25 of device 24, the camming surface 66 on cam member 64 rides past the roller 81 to suddenly or quickly release the swinging force applied to the socket element 76. The energy stored up in the torqued tray 25 furnishes power to thereupon bang the side of socket element 76 back against the stop or support 78 (see Figure 6) with a hammer-like blow to toss or flip the separated loosened ice blocks out of the inverted freezing device 24 into the removable receptacle 89 wherein they may be stored in dry form until harvested therefrom. At the time camming surface 66 on cam member 64 rides or moves past the side of roller 81 and after socket element 76 has banged against stop 78 the levers and linkage of the force multiplying mechanism will be returned, by coil spring 72, to their normal position. The arm 56 of lever 57 clears the roller 81, by being spaced laterally from its end, but the camming end of cam member 64 is disposed in its path as this camming end attempts to rotate back into its normal position. Pin 68, elongated opening 67 and spring 71 now cam into play. Upon the return stroke or swing of cam member 64 the underside of camming end 66 thereof strikes the roller 81 (see Figure 7) and moves the elongated opening 67 relative to pin 68. This permits cam member 64 to shift about the pivot stud 63 relative to lever 57 so as to cause its camming end 66 to now freely move down along the side of and past roller 81 on socket element 76. At this time the portion of cam member 64 intermediate opening 67 and stud 63 moves out of alignment with the arm 62 of lever 57 and engages the free end of spring 71. Spring 71 applies a force to the cam member 64, after it rides past roller 81, to move the same back into alignment with arm 62 or lever 57 and shifts the wall of opening in cam member 64 relative to and against pin 68. The cam member 64 is thereby relocated in a position where it will move into engagement with roller 81 simultaneously with movement of the leverage mechanism to again actuate and apply an upward force to this roller on element 76 when another freezing device 24 is to be twisted.

It should be apparent that I have provided an improved and novel arrangement for ejecting ice blocks from a freezing device by twisting the tray thereof. My improved ice ejector eliminates the necessity of anchoring tray twisting studs to the tray of a freezing device and therefore such studs do not tear or otherwise damage same by bending portions therof in the vicinity of such studs. In my invention a single leverage mechanism serves to release or eject ice blocks from a plurality of freezing devices to reduce the expense of providing a leverage mechanism on each of such devices. The force applied to the operating lever of the present ice block ejecting means is greatly increased at the point the force is to be used by the leverage arrangement shown whereby the mechanism is in reality a force multiplying mechanism which can be manually actuated with ease. The mechanism is enclosed by walls of the box-like member and prevents the fingers or hand of an operator from being cut or severed thereby during operation thereof. By banging the socket element in the apparatus disclosed back against a stop instead of flipping or banging the tray or a part thereof thereagainst or against supporting rails I reduce the likelihood of portions of the tray being damaged and also of the tray taking a permanent twisted or distorted set.

While the form of embodiment of the invention as herein disclosed constitutes a preferred form, it is to be understood that other forms might be adopted, as may come within the scope of the claims which follow.

What is claimed is as follows:

1. In combination, a refrigerator cabinet having a chamber therein, a refrigerating system associated with said cabinet including an evaporator for cooling said chamber to a temperature below 32° F., a box-like member forming a compartment having a freezing device receiving opening, opposed spaced apart stationary parallel supports in said box-like member adjacent the opening therein, a socket element within said compartment and having one side thereof pivotally mounted upon said box-like element for movement relative thereto and to said supports, a stop on said box-like member at the other side of said socket element and normally engaged thereby, a unitary freezing device disposed in said chamber, said device comprising an elongated tray and rigid walls loosely anchored therein for movement relative thereto and locked against removal therefrom, said walls dividing the interior of said tray into compartments in which water is to be frozen into separated ice blocks, said tray and said walls of said freezing device together with ice blocks therein being removable from said chamber, rotable into an inverted position and insertable into said box-like member through its freezing device receiving opening with the top of long sides of said tray supported on said opposed supports and with the inner end of the tray fitting in said socket element, a manually actuatable mechanism having a lever at the front of said box-like member and linkage means connecting said other side of the socket element to said lever for applying force to said socket element to swing same about its pivotal mounting away from said stop, means on said box-like member adapted to be engaged by the bottom of the forward end of said tray upon swinging said socket element, the swinging of said socket element by said mechanism twisting said tray and shifting said rigid walls therein relative thereto for breaking bonds between said device and ice blocks in said compartments thereof, and said mechanism including means for suddenly releasing the swinging force applied to said socket element whereby said torqued tray bangs said other side thereof back against said stop to toss the separated ice blocks out of said freezing device.

2. The combination defined by claim 1 wherein a storage receptacle is removably disposed in the box-like member below the supports therein and receives ice blocks tossed out of the inverted freezing device.

3. The combination defined by claim 1 wherein at least the linkage means of the mechanism is enclosed in the box-like member.

4. In combination, a refrigerator cabinet having a chamber therein, a refrigerating system associated with said cabinet including an evaporator for cooling said chamber to a temperature below 32° F., a box-like member forming a compartment having a tray receiving opening, opposed spaced apart stationary parallel supports in said box-like member adjacent the tray receiving opening therein, a socket element within said compartment and having one side thereof pivotally mounted upon said box-like member for movement relative thereto and to said supports, a stop on said box-like member at the other side of said socket element and normally engaged thereby, a freezing device disposed in said chamber, said device including an elongated tray in which water is to be frozen, said tray being removable from said chamber, rotatable into an inverted position and insertable into said compartment through its tray receiving opening with the top of long sides of said tray supported on said opposed supports and with the inner end of the tray fitting in said socket element, a manually actuatable mechanism having a lever at the front of said box-like member and linkage means connecting said other side of the socket element to said lever for applying a force to said socket element to swing same about its pivotal mounting away from said stop, means on said box-like member adapted to be engaged by the bottom of the forward end of said tray upon swinging said socket element, the swinging of said socket element by said mechanism twisting the tray for breaking bonds between said device and ice therein, and said mechanism including means for suddenly releasing the swinging force applied to said socket element whereby the torqued tray bangs said other side thereof back against said stop to toss ice out of said freezing device.

5. The combination defined by claim 4 wherein a storage receptacle is removably disposed in the box-like member below the supports therein and receives the ice tossed out of the inverted tray of the freezing device.

6. The combination defined by claim 4 wherein the linkage means of the lever actuated mechanism is enclosed in the box-like member.

7. In combination, a refrigerator cabinet having a chamber therein, a refrigerating system associated with said cabinet including an evaporator for cooling said chamber to a temperature below 32° F., a box-like member within said chamber and forming a compartment therein having a freezing device receiving front opening, opposed spaced apart stationary parallel supports in said box-like member adjacent the front opening thereof, a socket element within said compartment behind said supports and having one side thereof pivotally mounted upon the back of said box-like member for movement relative thereto and to said supports, a stop on said box-like member at the other side of said socket element and normally engaged thereby to position same in horizontal alignment with said supports, a unitary freezing device disposed in said chamber, said device comprising an elongated tray and rigid walls loosely anchored therein for movement relative thereto and locked against removal therefrom, said walls dividing the interior of said tray into compartments in which water is to be frozen into separated ice blocks, said tray and said walls of said device together with ice blocks bonded therein being removable from said chamber, rotatable into an inverted position and insertable into said box-like member through its front opening with the top of long sides of said tray supported on said opposed supports and with the inner end of the tray fitting in said socket element, a manually actuatable force multiplying mechanism associated with said box-like member for swinging said other side of said socket element about said pivotal mounting upwardly away from said stop, said mechanism including a first lever pivotally mounted to one side of said box-like member and having a handle end exposed at the front opening theereof, a second lever also pivotally mounted to said one side of said box-like member, a link extending along said one side of said box-like member and connecting said levers to one another and connecting means between said second lever and said other side of said socket member, means on said box-like member adapted to be engaged by the bottom of the forward end of the tray of said inverted freezing device upon swinging the socket element away from said stop, the swinging of said socket element by said mechanism twisting said tray and shifting said rigid walls therein relative thereto for breaking bonds between the freezing device and ice blocks in said compartments thereof, and said connecting means of said mechanism including means for suddenly releasing the swinging force applied to said socket element whereby the torqued tray bangs said other side thereof back against said stop to toss the separated ice blocks out of said freezing device.

8. The combination defined by claim 7 wherein a storage receptacle is removably disposed in the box-like member below the supports therein and receives ice blocks tossed out of the inverted freezing device.

9. The combination defined by claim 7 wherein the parts of the force multiplying mechanism are enclosed in the box-like member.

10. In combination, a refrigerator cabinet having an unfrozen food storage chamber and a frozen food storage chamber disposed one above the other therein, said frozen food chamber being substantially coextensive in width with said unfrozen food chamber and insulated therefrom, a refrigerating system associated with said cabinet including an evaporator for cooling said frozen food storage chamber to a temperature below 32° F., means forming a compartment in said frozen food chamber having spaced apart stationary parallel supports therein, a socket element within said compartment associated with said support and having one side thereof pivotally mounted upon said means for movement relative thereto and to said supports, a stop on said means at the other side of said socket element and normally engaged thereby, a unitary freezing device disposed in said frozen food storage chamber, said device comprising an elongated tray and rigid walls loosely anchored therein for movement relative thereto and locked against removal therefrom, said walls dividing the interior of said tray into compartments in which water is to be frozen into separated ice blocks, said tray and said walls of said freezing device together with ice blocks therein being removable from said frozen food chamber, rotatable into an inverted position and insertable into said means with the top of long sides of said tray supported on the supports therein and with an end portion of the tray fitting in said socket element, a manually actuatable force multiplying mechanism operable from the front of said means for swinging said other side of said socket element about its pivotal mounting away from said stop, the swinging of said socket element by said mechanism twisting said inverted tray within said means and shifting said rigid walls therein relative thereto for breaking bonds between said device and ice blocks in said compartments thereof, and means for suddenly releasing said socket element during swinging thereof whereby said torqued tray bangs said other side of said element back against said stop on said means to toss the separated ice blocks out of said inverted freezing device within the compartment of said frozen food chamber.

11. The combination defined by claim 10 wherein a storage receptacle is removably disposed in the means in the frozen food chamber and receives ice blocks tossed out of the inverted freezing device.

12. The combination defined by claim 10 wherein the force multiplying mechanism is enclosed by walls of the means within the frozen food chamber.

13. In combination, a refrigerator cabinet having a chamber therein, a refrigerating system associated with said cabinet including an evaporator for cooling said chamber, an apparatus associated with said refrigerator for ejecting ice from a unitary freezing device normally disposed therein, said unitary freezing device including an elongated distortable metal tray and walls therein movable relative thereto, said walls dividing the interior of said tray into compartments in which water is to be frozen into separated ice blocks, said apparatus comprising means for receiving and supporting said freezing device together with the walls and ice blocks therein, said means including a socket element pivotally mounted thereon and having one end of the tray of said freezing device fitting therein while the same is supported by said apparatus, a stop on said apparatus normally engaged by said socket element, a manually actuated force multiplying leverage mechanism associated with said socket element for swinging same about its pivotal mounting away from said stop to twist the tray of said freezing device, said walls in said freezing device being bodily shiftable therein relative thereto in response to twisting said tray for breaking bonds between said device and ice blocks in said compartments thereof, and said force multiplying mechanism including means for suddenly releasing the force applied thereby to said socket element during swinging thereof whereby the energy stored up in said torqued tray bangs said socket element back against said stop with a hammer-like blow and tosses the separated ice blocks out of said freezing device.

14. The combination defined by claim 13 wherein a storage receptacle is removably associated with the apparatus and receives ice blocks tossed out of the freezing device.

15. In combination, a refrigerator cabinet having a chamber therein, a refrigerating system associated with said cabinet including an evaporator for cooling said chamber to a temperature below 32° F., an apparatus associated with said refrigerator for ejecting ice from a unitary freezing device normally disposed therein, said unitary freezing device including an elongated tray and rigid walls loosely anchored in the tray for movement relative thereto and locked against removal therefrom, said walls dividing the interior of said tray into compartments in which water is to be frozen into separated ice blocks, said apparatus comprising means for receiving and supporting said freezing device together with ice blocks therein, said means including a pivotally mounted socket element having one end of the tray of said freezing device fitting therein while the same is supported by said apparatus and a stop normally engaged by said socket element, a manually actuated force multiplying leverage mechanism associated with said socket element for swinging same about its pivotal mounting away from said stop to twist the tray of said freezing device and shift said rigid walls therein relative thereto for breaking bonds between said device and ice blocks in said compartments thereof, and said force multiplying mechanism including means for suddenly releasing the force applied thereby to said socket element during swinging thereof whereby the energy stored up in said torqued tray bangs said socket element back against said stop with a hammer-like blow and tosses the separated ice blocks out of said freezing device.

References Cited in the file of this patent

UNITED STATES PATENTS

| 2,217,681 | Jennings | Oct. 15, 1940 |
| --- | --- | --- |
| 2,261,952 | Blomqvist | Nov. 11, 1941 |
| 2,342,670 | Jennings | Feb. 29, 1944 |
| 2,558,015 | Storer | June 26, 1951 |
| 2,674,862 | Nigro | Apr. 13, 1954 |